(12) United States Patent
Muffoletto et al.

(10) Patent No.: US 6,455,108 B1
(45) Date of Patent: Sep. 24, 2002

(54) METHOD FOR PREPARATION OF A THERMAL SPRAY COATED SUBSTRATE FOR USE IN AN ELECTRICAL ENERGY STORAGE DEVICE

(75) Inventors: Barry C. Muffoletto, Alden, NY (US); Ashish Shah, East Amherst, NY (US); Neal N. Nesselbeck, Lockport, NY (US)

(73) Assignee: Wilson Greatbatch Ltd., Clarence, NY (US)

(*) Notice: Subject to any disclaimer, the term of this patent is extended or adjusted under 35 U.S.C. 154(b) by 43 days.

(21) Appl. No.: 09/621,236

(22) Filed: Jul. 26, 2000

Related U.S. Application Data

(62) Division of application No. 09/020,717, filed on Feb. 9, 1998, now abandoned.

(51) Int. Cl.[7] .............................. H05H 1/26; C23C 4/10
(52) U.S. Cl. ...................... 427/446; 427/453; 427/455; 427/456; 427/449
(58) Field of Search .............................. 427/446, 449, 427/450, 451, 453, 455, 456, 569, 576, 577

(56) References Cited

U.S. PATENT DOCUMENTS

| | | | |
|---|---|---|---|
| 2,714,563 A | 8/1955 | Poorman et al. ............ 117/105 |
| 2,858,411 A | 10/1958 | Gage ........................... 219/75 |
| 2,950,867 A | 5/1960 | Hawley et al. ............... 239/13 |
| 3,016,447 A | 1/1962 | Gage et al. .................... 219/76 |
| 3,632,498 A | 1/1972 | Beer ........................... 204/290 |
| 3,755,065 A | 8/1973 | Chvatal ....................... 161/192 |
| 3,892,882 A | 7/1975 | Guest et al. ................. 427/34 |
| 3,914,573 A | 10/1975 | Muehlberger ................ 219/76 |
| 3,958,097 A | 5/1976 | Fabel et al. ................... 219/76 |
| 3,981,746 A | 9/1976 | Bezaudun et al. ............ 429/13 |
| 4,342,792 A | 8/1982 | Brown et al. ................. 427/34 |
| 4,392,927 A | 7/1983 | Fabian et al. ................. 204/98 |
| 4,543,265 A | 9/1985 | Kasuya ......................... 427/34 |
| 4,670,290 A | 6/1987 | Itoh et al. ..................... 427/34 |
| 4,707,422 A | 11/1987 | de Neufville et al. ........ 429/48 |

(List continued on next page.)

FOREIGN PATENT DOCUMENTS

| | | | |
|---|---|---|---|
| WO | 9526833 | 10/1995 | ............ B05D/1/32 |

OTHER PUBLICATIONS

Chapter 1—Fundamentals of Plasma Chemistry by Alexis T. Bill (selected pages only).
Chapter 2—Applications of Nonequilibrium Plasmas To Organic Chemistry by Harald Shur (Selected pages only).
Thermal Spray Coatings by James H. Clare and Daryl E. Drawman.
Plasma and Detonation Gun Deposition Techniques and Coating Properties by Robert C. Tucker, Jr.
Arc Surfacing and Cladding Process by W. Lucas (Feb., 1994).
Unique Alloys Broaden Spectrum of Arc–Spray Application by M.P. Zwetsloot (Feb., 1994).
Surface Using The HVOF Process by M. Breitsameter (Feb., 1994).
Thermal Spraying: Processes, Preparation, Coatings and Applications by Charles P. Howes, Jr. (Apr., 1994).

*Primary Examiner*—Brian K. Talbot
(74) *Attorney, Agent, or Firm*—Michael F. Scalise

(57) ABSTRACT

A pseudocapacitive material contacted to a substrate by a thermal spraying process, is described. Suitable thermal spraying processes include chemical combustion spraying and electrical heating spraying, using both wire and powder processes. The thusly coated substrate is useful as an electrode in an electrical energy storage device such as a capacitor, an electrochemical cell and the like.

30 Claims, 2 Drawing Sheets

U.S. PATENT DOCUMENTS

| | | | |
|---|---|---|---|
| 4,713,306 A | 12/1987 | Pinsky et al. | 429/218 |
| 4,766,522 A | 8/1988 | McHardy et al. | 361/433 |
| 4,798,662 A | 1/1989 | Clerc-Renaud et al. | 204/290 |
| 4,869,936 A | 9/1989 | Moskowitz et al. | 427/423 |
| 4,892,795 A | 1/1990 | Fang et al. | 429/194 |
| 5,080,056 A | 1/1992 | Kramer et al. | 123/193 |
| 5,098,485 A | 3/1992 | Evans | 148/272 |
| 5,126,205 A | 6/1992 | Chon et al. | 428/405 |
| 5,136,474 A | 8/1992 | Sarangapani et al. | 361/502 |
| 5,143,746 A | 9/1992 | Inoue et al. | 427/34 |
| 5,198,308 A | 3/1993 | Shetty et al. | 428/608 |
| 5,234,722 A | 8/1993 | Ito et al. | 427/453 |
| 5,254,415 A | 10/1993 | Williams et al. | 429/153 |
| 5,268,045 A | 12/1993 | Clare | 148/518 |
| 5,271,957 A | 12/1993 | Wernberg et al. | 427/109 |
| 5,271,967 A | 12/1993 | Kramer et al. | 427/455 |
| 5,272,802 A | 12/1993 | Stites, III | 29/527 |
| 5,285,967 A | 2/1994 | Weidman | 239/80 |
| 5,292,382 A | 3/1994 | Longo | 148/320 |
| 5,312,653 A | 5/1994 | Buchanan | 427/451 |
| 5,316,859 A | 5/1994 | Harada et al. | 428/472 |
| 5,323,954 A | 6/1994 | Shetty et al. | 228/187 |
| 5,324,407 A | 6/1994 | Ernes et al. | 204/242 |
| 5,328,763 A | 7/1994 | Terry | 428/559 |
| 5,397,657 A | 3/1995 | Ito et al. | 429/30 |
| 5,437,941 A * | 8/1995 | Arledge et al. | 429/129 |
| 5,492,723 A | 2/1996 | Paul et al. | 427/453 |
| 5,559,667 A | 9/1996 | Evans | 361/526 |
| 5,621,609 A | 4/1997 | Zheng et al. | 361/503 |
| 5,680,292 A | 10/1997 | Thompson, Jr. et al. | 361/528 |
| 5,716,422 A * | 2/1998 | Muffoletto et al. | 29/623.5 |
| 5,797,971 A | 8/1998 | Zheng et al. | 29/25.03 |
| 5,800,857 A * | 9/1998 | Ahmad et al. | 427/80 |
| 5,894,403 A * | 4/1999 | Shah et al. | 361/528 |
| 5,963,417 A | 10/1999 | Anderson et al. | 361/503 |

* cited by examiner

METHOD FOR PREPARATION OF A THERMAL SPRAY COATED SUBSTRATE FOR USE IN AN ELECTRICAL ENERGY STORAGE DEVICE

CROSS-REFERENCE TO RELATED APPLICATION

This application is a divisional of application Ser. No. 09/020,717, filed Feb. 9, 1998, now abandoned.

BACKGROUND OF THE INVENTION

1. Field of the Invention

The present invention generally relates to an electrical energy storage device, and more particularly, to a substrate provided with a thermal spray generated pseudocapacitive coating for incorporation into an electrical energy storage device. Still more particularly, the present invention provides a thermal spray generated porous, high surface area metal oxide, metal nitride, metal carbon nitride or metal carbide coating on a conductive foil for use in a capacitor, an electrochemical cell and the like. Thermal spray processes include both chemical combustion spraying and electric heating spraying, using both wire and powder forms of active materials.

2. Prior Art

In redox active structures, energy storage occurs during a change in the oxidation state of the metal when an ionic species from a conducting electrolyte, for example a proton, reacts with the surface or bulk of the oxide. This chemisorption is accompanied by the simultaneous incorporation of an electron into the oxide. The surface (or bulk) interaction between the electrode and electrolyte gives rise to capacitance in the hundreds of $\mu$F/sq.cm. It follows that an electrode with high specific surface area will store a significant amount of energy and will have a large specific capacitance. These electrodes are then appropriate when used as the anode and/or cathode in electrochemical capacitors or as cathodes in electrolytic capacitors, which require high specific capacitances.

Whether an anode or a cathode in an electrochemical capacitor or the cathode in an electrolytic capacitor, a capacitor electrode generally includes a substrate of a conductive metal such as titanium or tantalum provided with a semiconductive or pseudocapacitive oxide coating, nitride coating, carbon nitride coating, or carbide coating. The prior art describes various methods of contacting the substrate with those types of active materials. Commonly used techniques include dipping and pressurized air atomization spraying of the active material onto the substrate. Capacitance values for electrodes made by dipping, pressurized air atomization spraying and sputtering are lower in specific capacitance. Sol-gel deposition is another conventional method of coating the substrate. Additionally, it is exceptionally difficult to accurately control the coating morphology due to the controllability and repeatability of the various prior art techniques, which directly impacts capacitance.

Therefore, while electrochemical capacitors provide much higher energy storage densities than conventional capacitors, there is a need to further increase the energy storage capacity of such devices. One way of accomplishing this is to provide electrodes which can be manufactured with repeatably controllable morphology according to the present invention, in turn benefiting repeatably increased effective surface areas. In the case of a ruthenium oxide cathode, the coating according to the present invention is formed by thermal spraying a highly porous, high surface area pseudocapacitive film of ruthenium oxide onto the substrate.

SUMMARY OF THE INVENTION

The present invention, therefore, describes the thermal spray deposition of a metal-containing pseudocapacitive active material onto a conductive substrate. Thermal spraying is defined as any process in which particles are heated to a molten or plastic state and propelled onto a substrate to form a coating thereon. This includes chemical combustion spraying and electrical heating spraying, using both wire and powder processes. Thus, the present invention includes heating and projecting particles of an active material onto a prepared electrode substrate using a thermal spraying process to thereby provide an electrode component for an energy storage device such as a capacitor or an electrochemical cell and the like.

Thermal spray coatings of electrode active material usually exhibit two common features in the as-deposited condition, a sandpaper-like surface finish and a structure with inherent porosity. In that respect, thermal spray coating a pseudocapacitive active material onto a substrate provides a relatively low density, porous structure. This advantageously benefits the specific surface area which in turn benefits energy storage capacity and energy storage density and ultimately discharge efficiency. Therefore, the capacitance of pseudocapacitors can be further improved by using an electrode comprising a conductive substrate coated with a thermal spray deposited porous film to increase the surface area of the electrode.

These and other aspects of the present invention will become more apparent to those skilled in the art by reference to the following description and the appended drawings.

DESCRIPTION OF THE PREFERRED EMBODIMENTS

Figure 1:
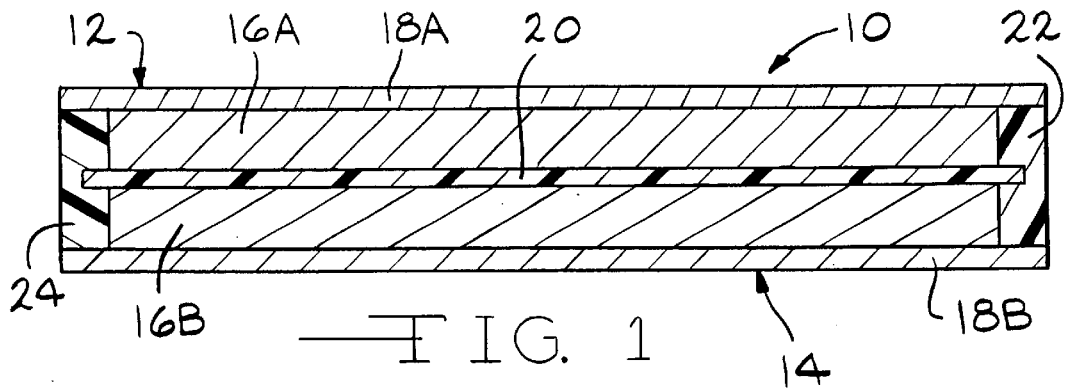
FIG. 1 is a schematic of a unipolar electrode configuration for use in an electrochemical capacitor.

Known thermal spraying processes may be classified into two groups namely, chemical combustion spraying processes and electric heating spraying processes. Chemical combustion spraying processes include powder flame spraying, wire/rod flame spraying, high velocity oxygen fuel flame spraying and detonation/explosive flame spraying. Electrical heating spraying processes include electric-arc or twin-wire arc spraying and plasma spraying. The two groups of spraying processes are generally delineated by the methods used to generate heat to plasticize and/or atomize the pseudocapacitive active material. In general, flame sprayed coatings exhibit lower bond strengths, higher porosity, a narrower working temperature range and a higher heat transmittal to the substrate than electric-arc and plasma sprayed coatings.

Depending on the process used, the pseudocapacitive material begins as a powder, solution or a wire of the active material. The powder, solution or wire form of the pseudocapactive material intended to be thermal spray contacted to the substrate preferably contains molar proportions of the active material in substantially the stoichiometric ratio needed to form the desired coating.

Powder flame spraying involves the use of a powder flame spray gun consisting of a high-capacity, oxygen-fuel gas torch and a hopper containing the pseudocapacitive active material in powder or particulate form. A small amount of oxygen from the gas supply is diverted to carry the powdered active material by aspiration into the oxygen-fuel gas flame where the powder is heated and propelled by the exhaust flame onto the substrate workpiece. The fuel gas is usually acetylene or hydrogen and temperatures in the range of about 3,000° F. to 4,5000° F. are typically obtained. Particle velocities are on the order of about 80 to about 100 feet per second. The coatings produced generally have low bond strength, high porosity and low overall cohesive strength.

Wire/rod flame spraying utilizes a wire of the pseudocapacative active material that is continuously fed into an oxy-acetylene flame where the wire is melted and atomized by an auxiliary stream of compressed air and then deposited as the coating of active material on the substrate. This process also lends itself to use of plastic tubes filled with the pseudocapacitive active material in a powder form.

High velocity, oxygen fuel flame spraying is a continuous combustion process that produces exit gas velocities estimated to be about 4,000 to about 5,000 feet per second and particle speeds of about 1,800 to about 2,600 feet per second. This is accomplished by burning a fuel gas (usually propylene) with oxygen under high pressure (60 to 90 psi) in an internal combustion chamber. Hot exhaust gases are discharged from the combustion chamber through exhaust ports and thereafter expanded in an extending nozzle. Pseudocapacitive active powder or solution is fed axially into the extending nozzle and confined by the exhaust gas stream until the active material exits in a thin high speed jet to produce coatings which are more dense than those produced by powder flame spraying.

A modified flame spraying process is referred to as a flame spray and fuse process. In this process, the pseudocapacitive component is prepared by coating a pseudocapacitive active material onto the substrate using one of the above described flame spraying processes followed by a fusing step. Fusing is accomplished by one of several techniques such as flame or torch, induction, or in vacuum, inert or hydrogen furnaces. Typical heating times for oxides may range from about one-half hour to about six hours.

More preferably, after spraying the coated substrate is then heated to a temperature of about 100° C. to 300° C., preferably about 250° C. for about one hour, followed by a further heating at a temperature of about 250° C. to 400° C., preferably about 300° C. for about two hours. This is immediately followed by a further heating at a temperature of about 350° C. to about 800° C., preferably about 400° C. for about two hours and fifteen minutes. While this three step heating protocol is preferred for fusing the pseudocapacitive material to the substrate, it is contemplated by the scope of the present invention that fusing may take place by a two step or a four step or more heating protocol.

Alternatively, the temperature is slowly and steadily ramped up, for example, at about 1° C./minute, preferably about 6° C./min. until the temperature reaches a temperature of about 100° C. to 800° C., preferably about 400° C. where the temperature is maintained for a time sufficient to allow the pseudocapacitive material to completely fuse to the substrate. Upon completion of the heating protocol, the heated and coated substrate is allowed to slowly cool to ambient temperature. In general, it is preferred to conduct this heating while contacting the substrate with air or an oxygen-containing gas. In that respect, the substrate material for the capacitor electrode needs to be able to withstand this temperature range.

Alternatively, the pseudocapacitor metal may be contacted to a substrate heated to a temperature to instantaneously fuse the pseudocapacitive material thereto. In that case, the substrate is at a temperature of about 100° C. to 800° C., preferably about 400° C., as the pseudocapacitive material is deposited on the substrate. Again, upon completion of fusing, the heated and coated substrate is allowed to slowly cool to ambient temperature.

In contrast to the previously described thermal spray processes, i.e., powder flame spraying, wire/rod flame spraying and high velocity, oxygen fuel flame spraying, which utilize the energy of a steady burning flame, the detonation/explosive flame spraying process uses detonation waves from repeated explosions of oxyacetylene gas mixtures to accelerate the powered pseudocapacitive active material onto the substrate. Particulate velocities on the order of 2,400 feet per second are achieved and the pseudocapacitive active material coating deposits are extremely strong, hard, dense and tightly bonded.

As previously discussed, the other type of thermal spraying useful for coating a substrate with a pseudocapacitive coating is electrical heating thermal spraying. One such electrical heating thermal spraying process is referred to as the electric-arc or twin-wire arc spraying process and uses two consumable wires of pseudocapacitive active material. The wires are initially insulated from each other and simultaneously advanced to meet at a focal point in an atomizing gas stream. Contact tips serve to precisely guide the wires and to provide good electrical contact between the moving wires and power cables. Heating is provided by means of a direct current potential difference applied across the wires to form an arc that melts the intersecting wires. A jet of gas (normally compressed air) shears off molten droplets of the melted pseudocapacitive active material and propels this material onto the substrate. Sprayed pseudocapacitive active material particle sizes can be changed with different atomizing heads and wire intersection angles. Direct current is supplied at potentials of about 18 to 40 volts, depending on the pseudocapacitive active material to be sprayed; the size of particle spray increasing as the arc gap is lengthened with rise in voltage. Voltage is therefore maintained at a higher level consistent with arc stability to provide larger particles and a rough, porous coating that is suitable for chemisorption of the ions produced by oxidation of the counter-electrode. Because high arc temperatures (in excess of about 7,240° F.) are typically encountered, twin-wire arc sprayed coatings have high bond and cohesive strength.

Plasma spraying involves the passage of a gas or a gas mixture through a direct current arc maintained in a chamber between a coaxially aligned cathode and water-cooled anode. The arc is initiated with a high frequency discharge that partially ionizes the gas to create a plasma having temperatures that may exceed 30,000° F. The plasma flux exits the gun through a hole in the anode which acts as a nozzle and the temperature of the expelled plasma effluent falls rapidly with distance. Powdered pseudocapacitive active material feed-stock is introduced into the hot gaseous effluent at an appropriate point and propelled to the workpiece by the high velocity stream. The heat content, temperature and velocity of the plasma gas are controlled by regulating arc current, gas flow rate, the type and mixture ratio of gases and by the anode/cathode configuration.

The substrate to be contacted with the pseudocapacitive coating preferably consists of a conductive metal such as titanium, molybdenum, tantalum, niobium, cobalt, nickel, stainless steel, tungsten, platinum, palladium, gold, silver, copper, chromium, vanadium, aluminum, zirconium, hafnium, zinc and iron, and the like, and mixtures and alloys thereof.

Regardless of the material of the substrate, coatings rely mostly upon mechanical bonding to the substrate surface. It is, therefore, critical that the substrate surface to be coated is properly prepared to ensure coating quality. For one, substrate surface cleanliness is very important in all coating systems, especially in pseudocapacitive coatings. In that respect, it is required that the substrate surface remain uncontaminated by lubricants from handling equipment or body oils from hands and the like. Substrate cleaning includes chemical means such as conventional degreasing treatments using aqueous and nonaqueous solutions, as well known to those skilled in the art. Plasma cleaning is also contemplated by the scope of the present invention.

After substrate surface cleaning, surface roughness is the next most critical factor for properly applying a pseudocapacitive coating. The substrate to be coated may be roughened by chemical means, for example, by contacting the substrate with hydrofluoric acid and/or hydrochloric acid containing ammonium bromide and methanol and the like, by plasma etching, and by mechanical means such as scraping, machining, wire brushing, rough threading, grit blasting, a combination of rough threading then grit blasting and abrading such as by contacting the substrate with Scotch-Brite™ abrasive sheets manufactured by 3M.

It is further contemplated by the scope of the present invention that, if desired, the electrical conductivity of the substrate is improved prior to coating. Metal and metal alloys have a native oxide present on their surface. This is a resistive layer and hence, if the material is to be used as a substrate for a capacitor electrode, the oxide is preferably removed or made electrically conductive prior to deposition of a pseudocapacitive coating thereon. In order to improve the electrical conductivity of the substrate, various techniques can be employed. One is shown and described in U.S. Pat. No. 5,098,485 to Evans, the disclosure of which is hereby incorporated by reference. A preferred method for improving the conductivity of the substrate includes depositing a minor amount of a metal or metals from Groups IA, IVA and VIIIA of the Periodic Table of Elements onto the substrate. Aluminum, manganese, nickel and copper are also suitable for this purpose. The deposited metal is then "intermixed" with the substrate material by, for example, a high energy ion beam or a laser beam directed towards the deposited surface. These substrate treating processes are performed at relatively low temperatures to prevent substrate degradation and deformation. Additionally, these treating processes can be used to passivate the substrate from further chemical reaction while still providing adequate electrical conductivity. For additional disclosure regarding improving the electrical conductivity of the substrate prior to deposition, reference is made to U.S. patent application Ser. No. 08/847,946 entitled "Method of Improving Electrical Conductivity of Metal, Metal Alloys and Metal Oxides", which is assigned to the assignee of the present invention and incorporated herein by reference.

The thermal spray coated substrate of the present invention consists essentially of a porous film coating (not shown) including the oxide of a first metal, the nitride of the first metal, the carbon nitride of the first metal and/or the carbide of the first metal, the oxide, nitride, carbon nitride and carbide of the first metal having pseudocapacitive properties. The first metal is preferably selected from the group consisting of ruthenium, cobalt, manganese, molybdenum, tungsten, tantalum, iron, niobium, iridium, titanium, zirconium, hafnium, rhodium, vanadium, osmium, palladium, platinum, and nickel. For example, in the case where it is intended that the resulting pseudocapacitive film is an oxide of one of the above listed first metals, the deposited mixture can include an anhydrous nitrate or an anhydrous chloride of the metal.

The porous coating may also include a second or more metals. The second metal is in the form of an oxide, a nitride, a carbon nitride or a carbide, and is not essential to the intended use of the coated foil as a capacitor electrode and the like. The second metal is different than the first metal and is selected from one or more of the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, and niobium. In a preferred embodiment of the present invention, the porous coating includes anhydrous oxides of ruthenium and tantalum.

It is preferred that the resulting porous coating, whether it be of an oxide, a nitride, a carbon nitride or a carbide, have a thickness of from about a few hundred Angstroms to about 0.1 millimeters or more. The porous coating has an internal surface area of about 1 $m^2$/gram to about 1,500 $m^2$/gram, and the majority of the particles have diameters less than about 50 microns. In general, the thickness of the substrate is typically in the range of about 0.001 millimeters to about 2 millimeter and preferably about 0.1 millimeters.

One advantage of the present process is that the substrate may be of substantially any size or shape, and it may be stationary or movable. Because of the speed of the coating process, the substrate may be moved across the thermally generated spray to have any or all of its surface contacted with the pseudocapacitive coating. The substrate is preferably moved in a plane which is substantially normal to the direction of flow of the thermally generated spray. In another embodiment, the substrate is moved stepwise along a predetermined path to coat the substrate only at certain predetermined areas. In another embodiment of the present process, rotary substrate motion is utilized to expose the surface of a complex-shaped article to the thermally generated spray. This rotary substrate motion may be effected by conventional means.

The process of the present invention provides for coating the substrate at a deposition rate of from about 0.01 to about 10 microns per minute and, preferably, from about 0.1 to about 1.0 microns per minute. The thickness of the film coated upon the substrate may be determined by means well known to those skilled in the art.

In a preferred embodiment of the present invention, the as-deposited coating layer consists of non-uniform grains. The term "as-deposited" refers to the film prior to any subsequent processing which the coated substrate may undergo after being contacted with the thermally generated spray. For example, the fusing step following the previously discussed flame spraying process is a subsequent processing step of the as-deposited active material.

It is preferred that the thermal spraying processes of the present invention are conducted under substantially atmospheric pressure conditions. As used in this specification, the term "substantially atmospheric" refers to a pressure of at least about 600 millimeters of mercury and, preferably, from about 600 to about 1,000 millimeters of mercury. As is well known to those skilled in the art, atmospheric pressure at sea level is 760 millimeters of mercury.

A thermal spray coated substrate according to the present invention is useful as an electrode in various types of electrochemical capacitors including unipolar and bipolar designs, and capacitors having a spirally wound configuration. For example, in FIG. 1 there is shown a schematic representation of a typical unipolar electrochemical capacitor 10 having spaced apart electrodes 12 and 14. One of the electrodes, for example, electrode 12, serves as the cathode electrode and comprises a thermal spray generated coating 16A of pseudocapacitive material provided on a conductive plate 18A according to the present invention. For example, a porous ruthenium oxide film is provided on plate 18A which is of a conductive material such as tantalum. The relative thicknesses of the plate 18A and the pseudocapacitive coating 16A thereon are distorted for illustrative purposes. As previously described, the plate is about 0.01 millimeters to about 1 millimeter in thickness and the coating 16A is in the range of about a few hundred Angstroms to about 0.1 millimeters thick. The other electrode 14 serves as the anode and is of a similar pseudocapacitive material 16B contacted to a conductive substrate 18B, as in electrode 12.

The cathode electrode 12 and the anode electrode 14 are separated from each other by an ion permeable membrane 20 serving as a separator. The electrodes 12 and 14 are maintained in the spaced apart relationship shown by opposed insulating members 22 and 24 such as of an elastomeric material contacting end portions of the plates 18A, 18B. The end plate portions typically are not coated with a pseudocapacitive material. An electrolyte (not shown), which may be any of the conventional electrolytes used in electrolytic capacitors, such as a solution of sulfuric acid, potassium hydroxide, or an ammonium salt is provided between and in contact with the cathode and anode electrodes 12 and 14. Leads (not shown) are easily attached to the electrodes 12 and 14 before, during, or after assembly of the capacitor and the thusly constructed unipolar capacitor configuration is housed in a suitable casing, or the conductive plates along with the insulating members can serve as the capacitor housing.

Figure 2:
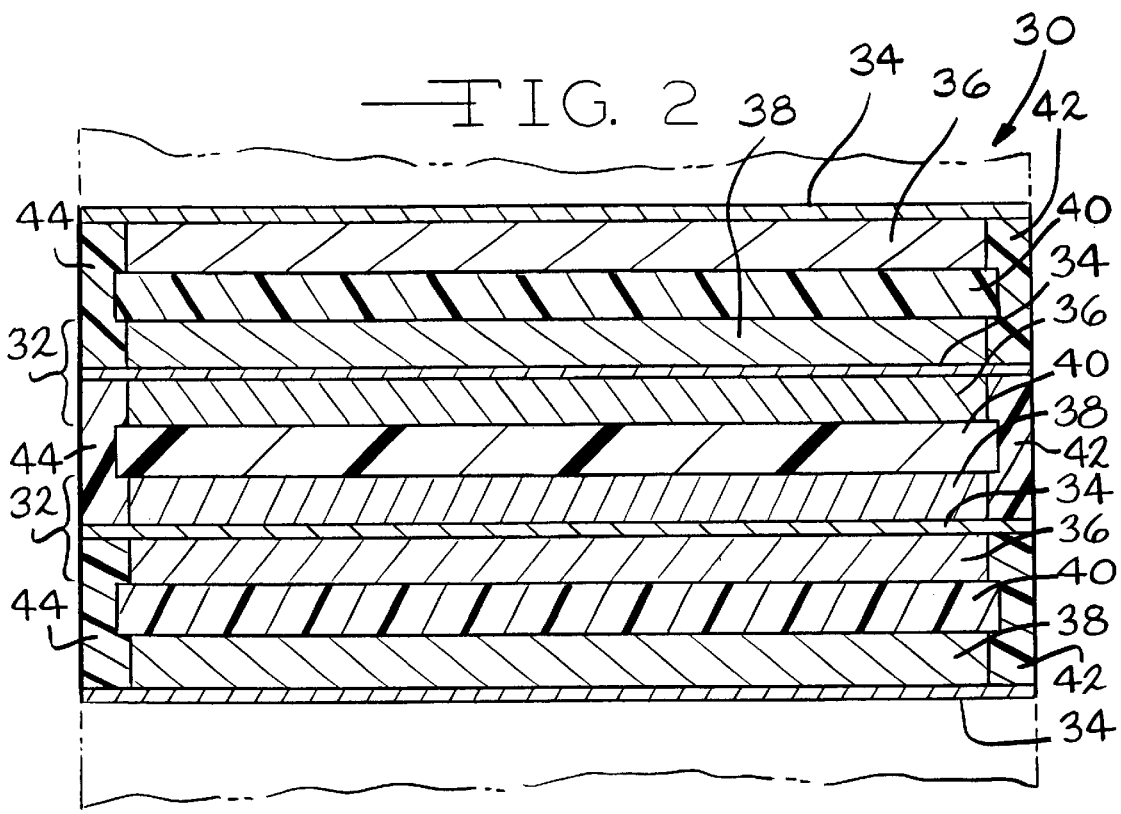
FIG. 2 is a schematic of a bipolar electrode configuration for use in an electrochemical capacitor.

FIG. 2 is a schematic representation of a typical bipolar electrochemical capacitor 30 comprising a plurality of capacitor units 32 arranged and interconnected serially. Each unit 32 includes bipolar conductive substrate 34. Porous pseudocapacitive coatings 36 and 38 are provided on the opposite sides of substrate 34 according to the present thermal spray coating processes. For example, a porous coating of ruthenium oxide film is deposited onto both sides of substrate 34. Again, the thickness of the porous coatings 36 and 38 is distorted for illustrative purposes. The units 32 are then assembled into the bipolar capacitor configuration on opposite sides of an intermediate separator 40. Elastomeric insulating members 42 and 44 are provided to maintain the units 32 in their spaced apart relationship. Materials other than elastomeric materials may be apparent to those skilled in the art for use as insulators 42, 44. As shown in the dashed lines, a plurality of individual electrochemical capacitor units 32 are interconnected in series to provide the bipolar configuration. The serial arrangement of units 32 is completed at the terminal ends thereof by end plates (not shown), as is well known to those skilled in the art. As is the situation with the unipolar capacitor configuration previously described, an electrolyte (not shown) is provided between and in contact with the coatings 36, 38 of the capacitor 30.

Figure 3:
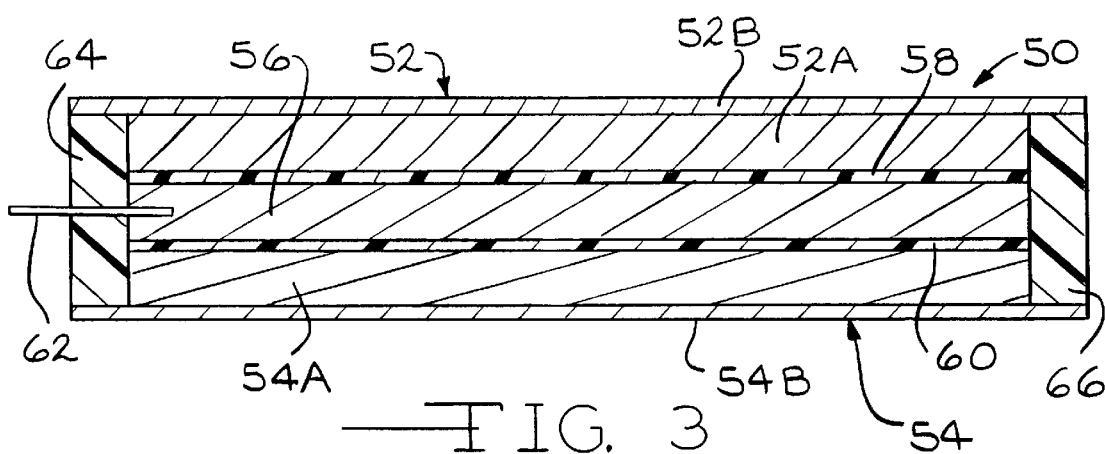
FIG. 3 is a schematic of a hybrid capacitor according to the present invention.

FIG. 3 shows a schematic representation of an electrolytic capacitor 50 having spaced apart cathode electrodes 52, 54, each comprising a respective thermal spray deposited coating 52A, 54A of pseudocapacitive material provided on a conductive plate 52B, 54B according to the present invention. The thickness of the porous coatings 52A, 54A is enlarged for clarity. The counter electrode or anode 56 is intermediate the cathodes 52, 54 with separators 58, 60 preventing contact between the electrodes. The anode 56 is of a conventional sintered metal, preferably in a porous form. Suitable anode metals are selected from the group consisting of titanium, aluminum, niobium, zirconium, hafnium, tungsten, molybdenum, vanadium, silicon, germanium and tantalum contacted to a terminal pin 62. The hybrid capacitor 50 is completed by insulating members 64, 66 contacting end portions of the cathode plates. While not shown, an electrolyte is provided to activate the electrodes 52, 54 and 56.

Figure 4:
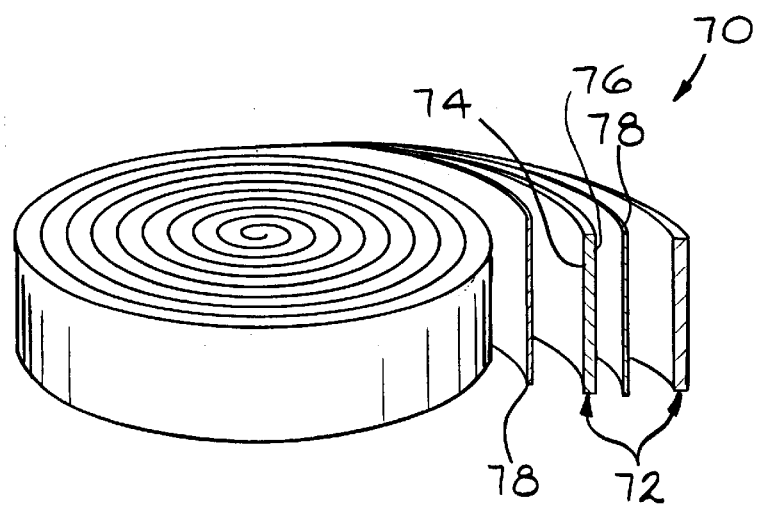
FIG. 4 is a schematic of a spirally wound configuration for use in a electrochemical capacitor.

FIG. 4 is a schematic drawing of another embodiment of a jelly roll configured capacitor 70, which can be manufactured, in part, by one of the thermal spray coating processes according to the present invention. Capacitor 70 has a plurality of capacitor units 72, each comprising a conductive substrate provided with a thermal spray generated pseudocapacitive coating 74, 76 on the opposed sides thereof. The coatings can be, for example of ruthenium oxide, separated from immediately adjacent cells by an intermediate separator 78. This structure is then wound in a jelly roll fashion and housed in a suitable casing. Leads are contacted to the anode and cathode electrodes and the capacitor is activated by an electrolyte in the customary manner.

When a pseudocapactive material is thermal spray deposited onto a substrate, the particle size of the active material can be smaller than that produced by the various prior art techniques previously discussed. This results in greater control over the manufacturing process in terms of controlling the coating morphology from one production run to the next. Furthermore, the use of a thermal spray deposited coating on a conductive substrate is believed to form an electrode for a capacitor according to the present invention that provides a higher surface area coating than that obtainable by the prior art, and thus a higher capacitance electrode.

Thus, it is apparent to those skilled in the art having read the foregoing description in conjunction with the appended figures that thermal spraying a pseudocapacitive active material represents a viable and alternate method of producing a capacitor electrode for incorporation into an electrical energy storage device such as a capacitor, an electrochemical cell and the like.

It is appreciated that various modifications to the inventive concepts described herein may be apparent to those skilled in the art without departing from the spirit and the scope of the present invention defined by the hereinafter appended claims.

What is claimed is:

1. A method for providing a capacitor electrode having pseudocapacitive properties, comprising the steps of:
   a) providing a substrate having a surface to be coated;
   b) providing a first pseudocapacitive metal compound comprising a first metal;
   c) contacting the substrate surface with particles of the first pseudocapacitive metal compound thermal spray deposited thereon; and
   d) heating the substrate to a temperature up to about 800° C. either just before it is contacted with the pseudocapacitive metal compound or after being so contacted.

2. The method of claim 1 including subjecting the coated substrate to a first heating at a first temperature of about 100° C. to about 300° C., followed by a second heating to a second temperature of about 250° C. to about 400° C., followed by a third heating to a third temperature of about 350° C. to about 800° C.

3. The method of claim 2 wherein the first heating is for about one hour.

4. The method of claim 2 wherein the second heating is for about two hours.

5. The method of claim 2 wherein the third heating is for about two hours and fifteen minutes.

6. The method of claim 1 including subjecting the coated substrate to a first heating at a first temperature of about 250° C., followed by a second heating to a second temperature of about 300° C. followed by a third heating to a third temperature of about 400° C.

7. The method of claim 1 including heating the coated substrate by increasing the heating temperature by about 1° C./minute to about 6° C./minute to a final temperature of about 350° C. to about 800° C.

8. The method of claim 1 including heating the coated substrate to about 400° C. by increasing the heating temperature by about 1° C./minute to about 6° C./minute.

9. The method of claim 1 wherein the heating takes place in an oxygen-containing atmosphere.

10. The method of claim 1 including providing a majority of the particles having diameters of less than about 50 microns.

11. The method of claim 1 including providing the coating having an internal surface area of about 1 $m^2$/gram to about 1,500 $m^2$/gram.

12. The method of claim 1 including providing the coating having a thickness of about a few hundred Angstroms to about 0.1 millimeters.

13. The method of claim 1 including selecting the first pseudocapacitive metal compound from the group consisting of an oxide, a nitride, a carbon nitride, a carbide, and mixtures thereof.

14. The method of claim 1 including selecting the first metal from the group consisting of ruthenium, molybdenum, tungsten, tantalum, cobalt, manganese, nickel, iridium, iron, titanium, zirconium, hafnium, rhodium, vanadium, osmium, palladium, platinum, niobium, and mixtures thereof.

15. The method of claim 1 including providing a second metal in the thermal spray deposited coating.

16. The method of claim 1 including selecting the second metal from the group consisting of tantalum, titanium, nickel, iridium, platinum, palladium, gold, silver, cobalt, molybdenum, ruthenium, manganese, tungsten, iron, zirconium, hafnium, rhodium, vanadium, osmium, niobium, and mixtures thereof.

17. The method of claim 1 including providing the thermal spray deposited coating as a mixture of ruthenium and tantalum.

18. The method of claim 1 including selecting the substrate from the group consisting of tantalum, titanium, nickel, molybdenum, niobium, cobalt, stainless steel, tungsten, platinum, palladium, gold, silver, copper, chromium, vanadium, aluminum, zirconium, hafnium, zinc, iron, and mixtures thereof.

19. The method of claim 1 including subjecting the substrate to a first treatment prior to contacting it with the thermal spray deposited coating, wherein the first treatment increases the substrate's surface area in comparison to that of the substrate in a pre-treatment condition.

20. The method of claim 1 including contacting the substrate with an acid, thereby increasing the substrate surface area.

21. The method of claim 20 including selecting the acid from the group consisting of hydrofluoric acid and hydrochloric acid.

22. The method of claim 21 including providing the acid as an acid solution including ammonium bromide and methanol.

23. The method of claim 1 including increasing the substrate surface area by mechanical means including rough threading, grit blasting, scraping, plasma etching, abrading and wire brushing.

24. The method of claim 1 including subjecting the substrate to a second treatment prior to contacting it with the thermal spray deposited coating, wherein the second treatment increases the substrate's electrical conductivity in comparison to that of the substrate in a pre-treatment condition.

25. The method of claim 1 including providing the substrate having a thickness of about 0.001 to about 2 millimeters.

26. The method of claim 1 including selecting the thermal spray deposited process from the group consisting of a high velocity oxygen fuel flame spray coating process, an electric-arc spraying process, a plasma spray coating process, a powder flame spraying process, a wire/rod flame spray coating process and a detonation/explosive flame spray coating process.

27. A method for providing a capacitor electrode having pseudocapacitive properties, comprising the steps of: providing a substrate having a surface to be coated; providing a first pseudocapacitive metal compound comprising a first metal; heating the substrate to a temperature up to about 800° C.; and contacting the heated substrate with the first pseudocapacitive metal compound thermal spray deposited on the substrate surface.

28. A method for providing a capacitor electrode, comprising the steps of:

a) providing a substrate having a surface to be coated;

b) providing a ruthenium-containing compound;

c) contacting the substrate surface with particles of the ruthenium-containing compound thermal spray deposited thereon; and d) heating the substrate to a temperature up to about 800° C. either just before it is contacted with the ruthenium-containing compound or after being so contacted.

29. The method of claim 28 including providing the ruthenium-containing compound as an oxide of ruthenium and tantalum.

30. A method for providing a capacitor cathode, comprising the steps of:

a) providing a tantalum substrate;

b) providing an oxide compound of ruthenium and tantalum;

c) contacting the substrate with particles of the oxide compound thermal spray deposited thereon; and d) heating the substrate to a temperature up to about 800° C. either just before it is contacted with the oxide compound of ruthenium and tantalum or after being so contacted to provide the cathode.

* * * * *